April 22, 1941.   C. A. WALDSMITH   2,238,921
METHOD OF AND APPARATUS FOR OPERATING ON WORKPIECES
Filed Feb. 10, 1939   4 Sheets-Sheet 1

INVENTOR
Cecil A. Waldsmith
By Parker, Carlson, Pitzner & Hubbard
ATTORNEYS

April 22, 1941.  C. A. WALDSMITH  2,238,921
METHOD OF AND APPARATUS FOR OPERATING ON WORKPIECES
Filed Feb. 10, 1939  4 Sheets-Sheet 2
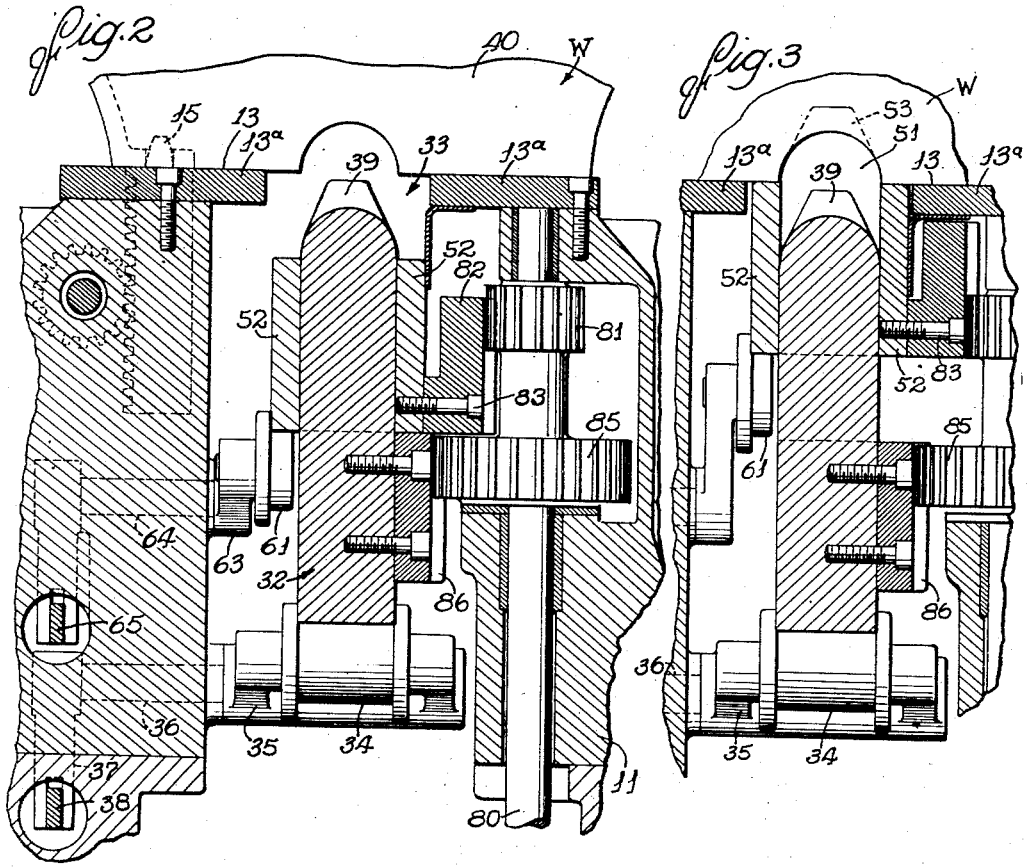
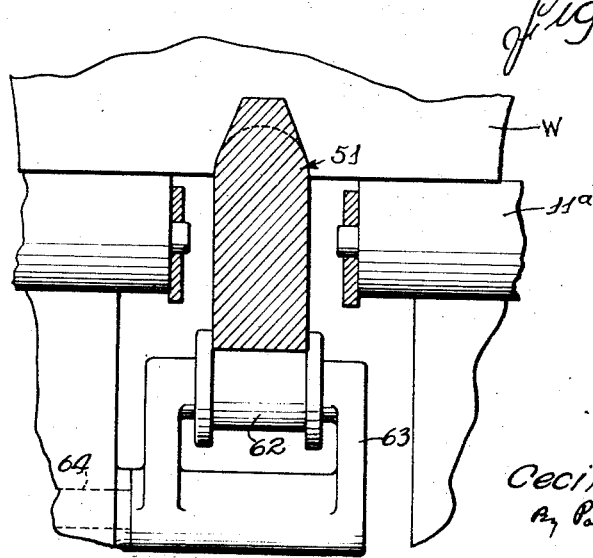
INVENTOR
Cecil C. A. Waldsmith
By Parker, Carlson, Pitzner & Hubbard
ATTORNEYS

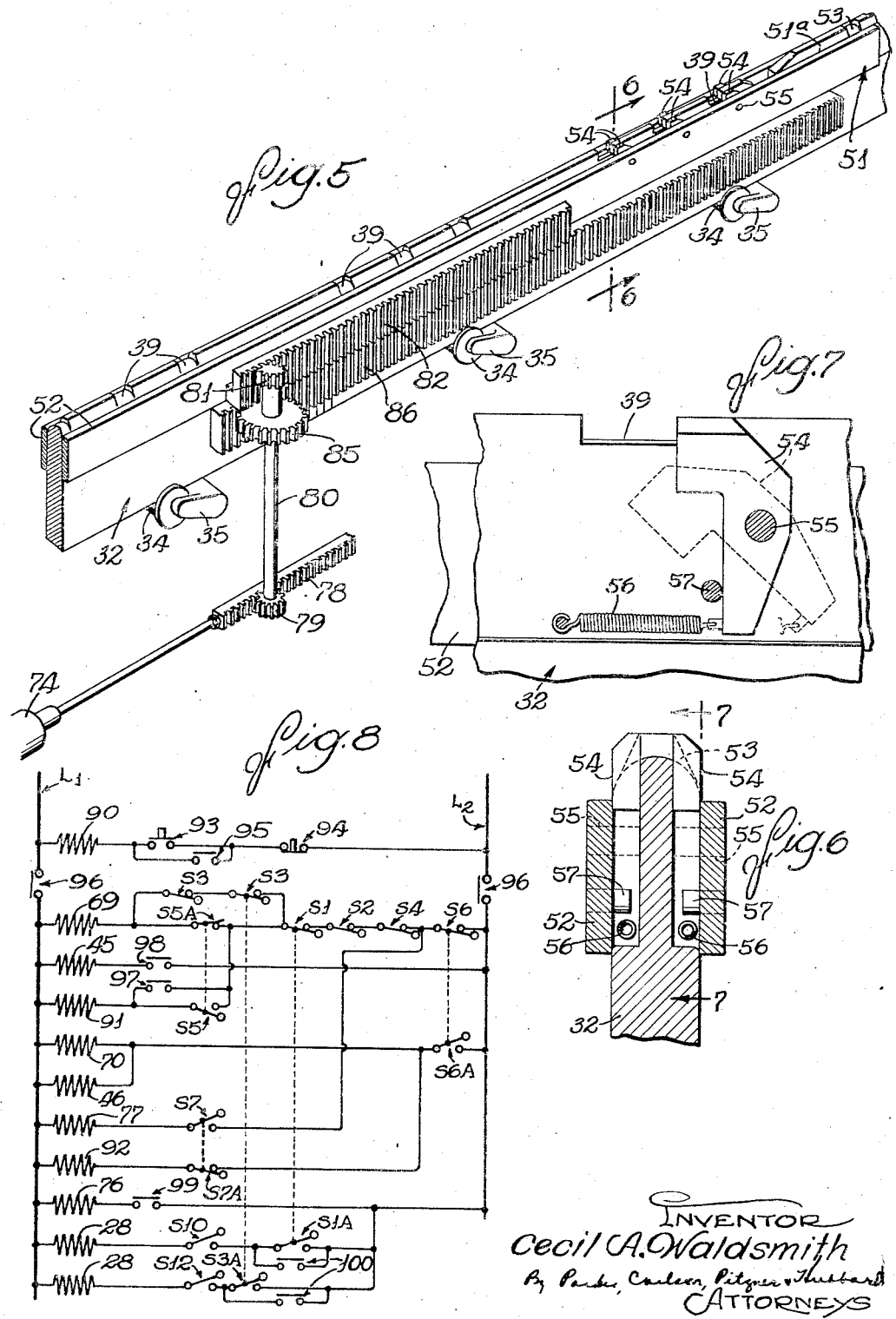

April 22, 1941.   C. A. WALDSMITH   2,238,921
METHOD OF AND APPARATUS FOR OPERATING ON WORKPIECES
Filed Feb. 10, 1939   4 Sheets-Sheet 4
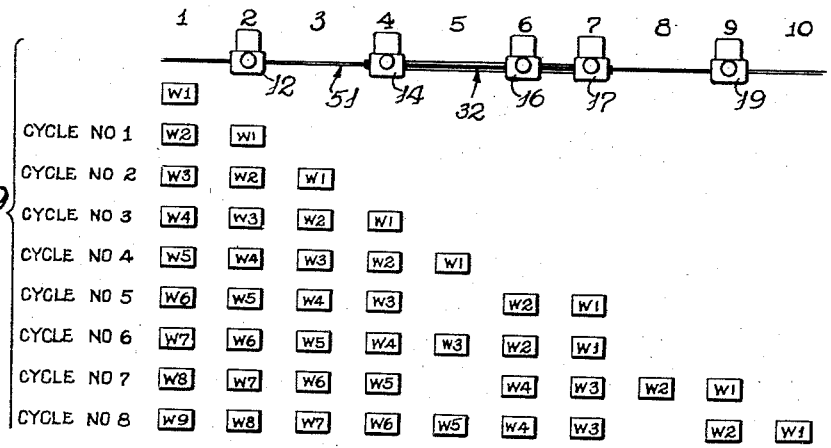
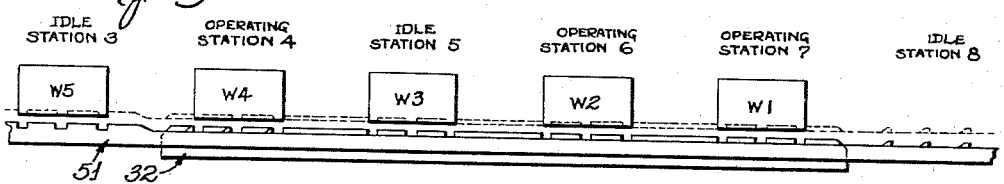
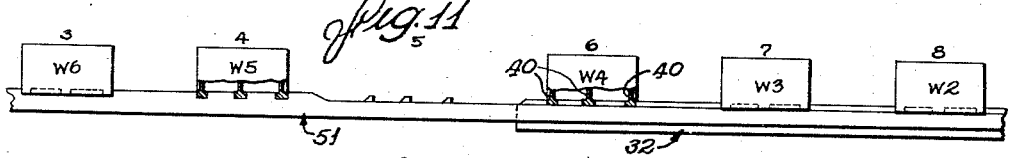
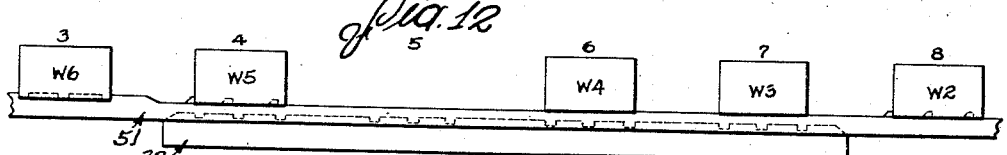
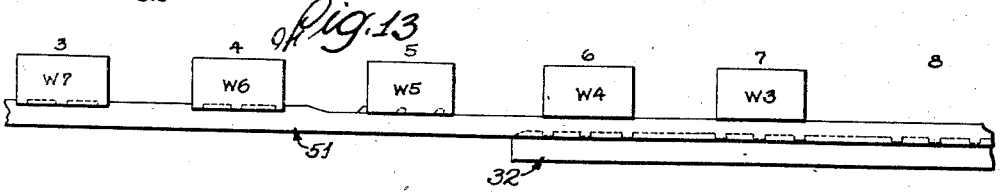
INVENTOR
Cecil A. Waldsmith
By Parker, Carlson, Pitzner & Hubbard
ATTORNEYS Patented Apr. 22, 1941

2,238,921

UNITED STATES PATENT OFFICE 2,238,921

METHOD OF AND APPARATUS FOR OPERATING ON WORKPIECES

Cecil A. Waldsmith, Rockford, Ill., assignor to The Ingersoll Milling Machine Company, Rockford, Ill., a corporation of Illinois Application February 10, 1939, Serial No. 255,624

27 Claims. (Cl. 29—33)

This invention relates to handling and machining of workpieces in a production line including a series of stations through which workpieces are transferred successively and at certain of which stations operations, such as metal removing, are performed, usually while the workpieces are at rest.

The production capacity of such an organization is limited by the slowest operation required to be performed. To overcome this limitation, it has been proposed to duplicate the slower stations and provide for machining of the adjacent workpieces in different slower stations.

The primary object of the present invention is to provide a novel method of and apparatus for transferring the workpieces through all of the stations in a machine tool organization of the above character without the necessity of shifting the workpiece laterally out of a continuous path.

The invention also resides in the novel and simple construction of the mechanism by which the transfer of the workpieces through the slow and fast stations is effected and the movements are synchronized.

Other objects and advantages of the invention will become apparent from the following detailed description taken in connection with the accompanying drawings, in which Figure 1 is a schematic view and hydraulic circuit diagram of a machine tool organization for practicing the present invention.

Fig. 2 is a fragmentary cross-sectional view taken along the line 2—2 of Fig. 1.

Fig. 3 is a similar view illustrating different positions of the parts.

Fig. 4 is a sectional view taken along the line 4—4 of Fig. 1.

Fig. 5 is a fragmentary perspective view of part of the work transfer mechanism.

Fig. 6 is a fragmentary sectional view taken along the line 6—6 of Fig. 5.

Fig. 7 is a sectional view taken along the line 7—7 of Fig. 6.

Fig. 8 is a wiring diagram.

Fig. 9 is a schematic view illustrating the progress of different workpieces through the stations of the line-up in successive operating cycles.

Figs. 10, 11, 12 and 13 illustrate the relation of the transfer members and workpieces in different parts of the operating cycles.

Figure 1:
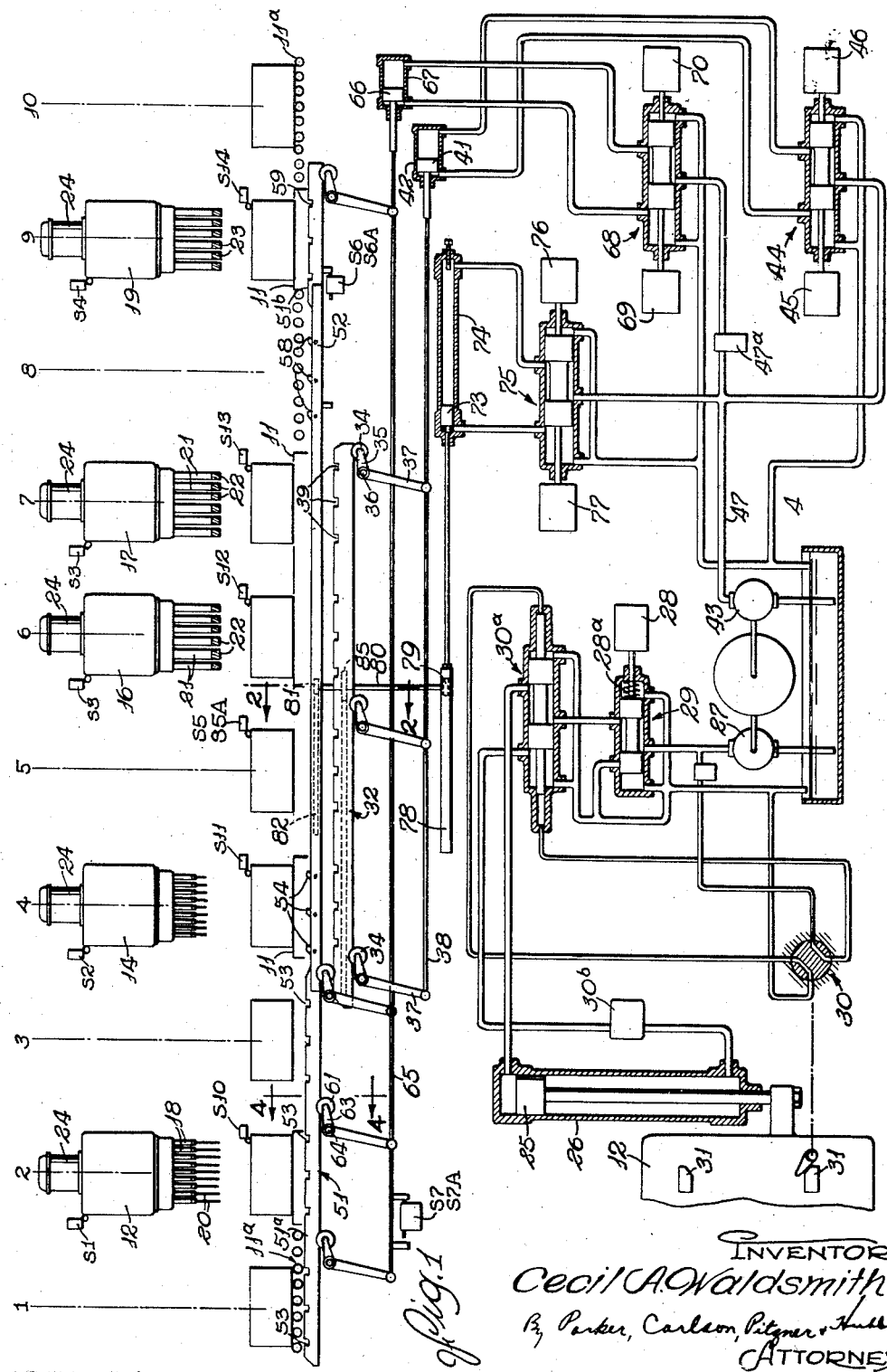

While the invention is susceptible of various modifications and alternative constructions and modes of operations, I have illustrated in the drawings and will herein describe in detail a typical machine tool organization in which the invention may be practiced. It is to be understood that I do not intend to limit the invention by such disclosure but aim to cover all modifications and alternative constructions, methods and uses falling within the spirit and scope of the invention as expressed in the appended claims.

In the exemplary embodiment shown, the invention involves the performance of a series of metal-removing operations on workpieces $w$ while the latter are disposed in five separated machines or operating stations indicated generally at 2, 4, 6, 7, and 9 preceded and followed by idle loading and unloading stations 1 and 10. The adjacent work stations, except 6 and 7, are separated by idle stations 3, 5 and 8. The workpieces as a group are indexed intermittently along a horizontal slideway on a bed structure 11 and conveyor rollers 11ª defining a rectilinear path of advance of the workpieces through the series of work stations. At each operating station, the workpiece comes to rest on a horizontal support 13 (Fig. 2) defined by rails or skid plates 13ª and is accurately located in final working position by upwardly movable dowel pins 15. It is held firmly in place by clamps (not shown) while being operated upon by one or more tools carried by tool heads 12, 14, 16, 17 and 19 mounted in the usual way for individual sliding movement toward and away from the workpieces in the respective operating stations.

The power actuators for the work transferring mechanism, dowels 15, the work clamps, and the different tool heads are controlled automatically and properly interlocked for synchronous operation in an automatic cycle started by the operation of a single control device. As a result, positioning of the workpieces on the conveyor at the loading station 1 and removal of the finished workpieces at the unloading station 10 are the only manual operations required to be performed in the illustrated production line-up. For further details of the head supporting structure, the work clamps, the actuators for the clamps and dowels and the manner of interlocking their operation with the other parts with which the present invention is concerned, reference may be made to a copending application of Alexander Oberhoffken and John M. Strachan, Serial No. 204,120, filed April 25, 1938.

On account of the size or shape of the particular workpiece being operated upon, it may be desirable to support the workpieces through the medium of individual fixtures slidable along the production line with its associated workpiece. As used herein, the term workpiece is intended to include any such fixtures or parts that might be attached to the workpiece proper and moved therewith.

The exemplary production line is adapted to perform a series of drilling and rough and finish boring operations on one side of the workpieces. These are typical of the operations which might, for example, be performed on the engine blocks of internal combustion engines, the rough boring of the cylinders of such engines being a slow machining operation as compared to drilling or finish boring. Milling or other surfacing are examples of other operations which usually require a substantial time interval. The heads 2 and 4 are equipped with spindles 18 carrying drilling tools 20 while spindles 21 on the heads 16 and 17 carry tools 22 by which cylinders in the workpiece might be rough bored. Finish boring of the same cylinders is accomplished by similar tools 23 on the head 19 at the fast station 9.

The tool spindles on the different heads are driven by individual motors 24 and the heads may be reciprocated into and out of operative engagement with the workpieces by hydraulic actuators including pistons 25 (Fig. 1) connected to the heads and operating in stationary cylinders 26. Pressure fluid delivered by a motor driven pump 27 may be directed to the different cylinders by the energization of solenoids 28 operating individual stop valves 29 which are normally closed by springs 28$^a$. The direction of advance of each head is determined in any well known manner as by a reversing valve 30$^a$ which is shifted hydraulically into opposite positions under the control of a pilot valve 30 which may be actuated automatically by dogs 31 on the associated head to cause the latter to advance and return in an automatic cycle. The advancing movements of the tool heads may be slowed to the desired feed rates by adjustment of valves 30$^b$ controlling the discharge of fluid from the rod ends of the cylinder 26.

The stations 1 to 10 are spaced equal distances apart along the path of travel of the workpieces. Preferably, the rough boring stations 6 and 7 are disposed adjacent each other while the other operating stations are separated from the rough boring stations and from each other by one or more idle stations.

The present invention contemplates transferring the workpieces through the line of idle and operating stations in a novel manner such that each workpiece dwells in and is machined at each of the stations 2, 4 and 9 at which the rapid machining operations are performed while the adjacent workpieces are transferred into and machined in the different slow operating stations 6 and 7 where the pieces dwell for at least two cycles of the faster stations. To accomplish this, the adjacent workpieces to be machined simultaneously in the slow stations 6 and 7 are advanced in multiple length steps from the preceding stations 4 and 5 into the stations 6 and 7, and, after two operating cycles, the same pieces are advanced in a double length step to the stations 8 and 9. Where, as in the present instance, two slow operating stations are used, these advancing movements occur in alternate operating cycles of the faster stations, the even numbered pieces being machined in the station 6 and the odd numbered pieces in the station 7.

Such differential advancing movements may be effected simply and conveniently through the use of independent transfer members of the shuttle or reciprocable type arranged to be actuated in proper timed relation and to act selectively on the proper workpieces in the different stations under the control of the movements of the tool heads and the movement of workpieces into one of the idle stations. Herein, the member for imparting the double length movements comprises a bar 32 of a length sufficient to overlap the workpieces in four successive stations. It is mounted for endwise reciprocation longitudinally of the central channel 33 between the skid plates 13$^a$ and is supported for bodily vertical movement into and out of interengagement with the workpieces either in the stations 4 to 7 or in the stations 6 to 9. Such engagement may be obtained by providing groups of notches 39 along the upper edge of the bar spaced to receive the end walls or partitions 40 (Fig. 11) of four adjacent workpieces. When thus interengaged, the workpieces and the bar are coupled together and adapted to move endwise in unison, uncoupling of the bar being effected by lowering of the latter.

In the present instance, the bar 32 is supported by a series of flanged rollers 34 carried by crank arms 35 which are fast on rockshafts 36 journaled in the bed structure and carrying depending arms 37 connected to a rod 38 by which the arms are actuated in unison to raise and lower the bar. Actuation of the bar 32 to raise the same from its lowered position (Fig. 2) to its upper position (Fig. 4) may be effected conveniently by an hydraulic operator comprising a piston 41 connected to the rod 38 and reciprocable in a cylinder 42. Pressure fluid from a motor driven pump 43 is admitted to the rod end of the cylinder through a supply pipe 47 when a valve 44 is shifted by energization of a solenoid 45, the head end being then connected to the drain line 48. This results in raising the bar. Lowering of the bar occurs when a solenoid 46 is energized shifting the valve to connect the pressure line to the head end of the cylinder.

The other transfer member which operates in each machine cycle to impart a single length movement to the workpieces not engaged by the bar 32 comprises a bar 51 divided into longitudinal sections 51$^a$ and 51$^b$ having their adjacent ends rigidly connected by plates 52 disposed on opposite sides of and forming a guide for the bar 32. The longitudinal spacing of the sections is such as to allow for the longer stroke of the bar 32 and each section overlaps the adjacent end portion of the bar 32 so that each transfer member is adapted for coupling to a workpiece in the station 4 or in the station 8.

The section 51$^a$ is provided with three groups of notches 53 for interengagement with the workpieces at the stations 1, 2 and 3 when the bar is retracted as shown in Fig. 1. To connect the bar with the piece in the station 4, three pairs of pawls 54 are pivoted at 55 on the plates 52 and provide spaced shoulders for engaging the walls 40 of the workpiece when the bar 51 is raised while in retracted position. The pawls of each pair are disposed on opposite sides of the bar 32 and register with the notches 39 therein when both bars are retracted. Springs 56 normally urge the pawls 54 into active position against a stop 57 but permit of lowering of the pawls to the position shown in dotted outline (Fig. 7) for a purpose to appear later. A similar set of yieldably retractible pawls 58 is provided at the opposite end of the plates 52 to engage workpieces in the station 8. Notches 59 formed in the bar section 51b are provided for interengagement of the bar and the workpiece at the station 9.

Like the bar 32, the bar 51 is mounted for bodily vertical movement into and out of engagement with the proper workpieces and also for endwise reciprocation. To this end, it is supported by flanged rollers 61 and 62 mounted on cranks 63 which are fast on shafts 64 carrying arms adapted to be rocked by a common rod 65. The latter is connected to a piston 66 in a cylinder 67 to which the flow of pressure fluid is controlled by a valve 68. The rod 65 is shifted in a direction to raise the bar 51 when the valve is actuated by energization of a solenoid 69. Energization of a solenoid 70 reverses the valve to admit pressure fluid to the head end of the cylinder and shift the rod 65 to lower the bar as shown in Fig. 1. A pressure build-up valve 47a is connected in the line 47 to delay the raising of the bar 51 until the bar 32 has been raised.

Proper timing of the strokes of the transfer members 32 and 51 and control of the relative lengths of the strokes may be effected conveniently by providing for reciprocation of the members by a common actuator. The one shown herein is of the hydraulic type comprising a piston 73 reciprocable in an elongated cylinder 74 through a distance corresponding accurately to the location and spacing of the work stations particularly the spacing of the adjacent slow operating stations 6 and 7. The flow of fluid from the pressure line 47 to opposite ends of the cylinder is controlled by a valve 75 shifted in opposite directions by energization of solenoids 76 and 77.

Reciprocatory movements of the piston are communicated to the transfer member 51 through a rack 78 connected to the piston rod, a pinion 79 on a vertical shaft 80 and a gear 81 meshing with a rack bar 82 fastened by screws 83 to one of the plates 52. The shaft is journaled in bearings in the bed structure and the rack bar 82 is of sufficient width to remain in mesh with the gear 81 in all vertical positions of the transfer bar. As a result of this arrangement, the transfer bar 51 will be moved to the left as viewed in Fig. 1 when fluid is admitted to the rod end of the cylinder and to the right when the solenoid 76 is energized to cause a flow of fluid to the head end. The length of the stroke is determined by stops for the piston 73 which are adjusted to provide a movement equal to the spacing of the workpieces in their different rest positions.

To provide for double length movement by the transfer bar 32, the shaft 80 carries a second gear 85 meshing with a wide rack bar 86 screwed to the side of the transfer bar beneath the plate 52. The number of teeth on the gear 85 is twice the number on the gear 81 so that the stroke of the bar 32 is twice that of the bar 51.

The movements of the transfer members and tool heads are controlled in automatic cycles by the circuit arrangement shown in Fig. 8 from which the actuators for the dowel pins 15 and the work clamps as well as various well known interlocking switches have been omitted for the sake of simplicity. For these details, reference may be had to the copending application previously referred to. As shown, solenoids 45, 46, 69, 70, 76, and 77, the solenoids 28, one for each of the tool heads, 12, 14, 16, 17, and 19, and three relays 90, 91, and 92 are interposed in circuits extending between power leads L1 and L2 and controlled by various switches which are actuated in response to movements of the workpieces, the tool heads, the transfer bar 51 and the bar elevating mechanism.

Let it be assumed that workpieces have been machined in all of the operating stations and that the tool heads have been retracted fully as shown in Fig. 1. Under these conditions, switches S1, S2, S3, S3, and S4 will be closed by the retracted tool heads 12, 14, 16, 17, and 19 and their associated switches S10, S11, S12, S13 and S14 would be closed by the presence of workpieces in the stations 2, 4, 6, 7, and 9. A switch S5 by the presence of a workpiece in the idle station 5 and its associated switch S5A will be open. Since the transfer bar 51 is lowered, a switch S7 will be open and its associated switch S7A will be closed. The bar 32 being retracted, the switch S6 is closed and an associated switch S6A is open, the latter being closed at the other end of the stroke of the transfer bar.

With the circuits thus conditioned, a cycle of operation may be initiated by closure of a start switch 93. This energizes the relay 90 through a normally closed stop switch 94 and energization of the relay is held by a switch 95 closed when the relay is energized. The relay also closes switches 96 for making power available to the other circuits. The solenoid 69 is thus energized through the then closed switches S3, S3, S1, S2, S4, and S6 and the valve 68 is shifted to admit pressure fluid to the rod end of the cylinder 67 thereby causing the transfer bar 51 to be raised into engagement with the workpieces at stations 1, 2, 3, 4, and 9 as shown in Fig. 10, there being no piece at this time in station 8. Simultaneously, the relay 91 is energized through S6, S4, S2, S1, and S5. This in turn closes a switch 97 to seal the relay through S1, S2, S4, and S6 and also closes a switch 98 controlling the circuit for the solenoid 45. Energization of the latter shifts the valve 44 to admit fluid to the rod end of the cylinder 42 thereby causing the other transfer bar 32 to be raised into engagement with the workpieces in stations 4, 5, 6, and 7 as shown in Fig. 10 in dotted outline.

When the transfer bar 51 becomes fully raised which will occur after the full raising of the bar 32 because of the valve 47a, switch S7 is closed completing the circuit for the solenoid 77 through S6. This admits fluid to the rod end of the cylinder 74 causing both transfer bars 32 and 51 to be advanced. Since the bar 32 moves faster than the bar 51, the workpiece from the station 4 depresses the pawls 54 on the bar 51 to the position shown in dotted outline in Fig. 7 and overrides or is carried ahead of the bar 51 by the bar 32. In the advance of the two bars to the position shown in Fig. 11, workpieces from the stations 1, 2, 3, and 9 will be advanced by the bar 51 through a single length step and will come to rest in stations 2, 3, 4, and 10 respectively. The pieces in the stations 4, 5, 6, and 7 will be advanced through a double length step coming to rest in stations 6, 7, 8, and 9 respectively.

Switch S6 is opened and S6A is closed at the end of the active stroke of the bar 51, the former energizing the solenoids 46 and 70 causing fluid to flow into the head ends of the cylinders 42 and 67 thereby lowering both of the transfer bars. In response to lowering of the bar 51, switch S7 is opened and S7A is closed, the former deenergizing the solenoid 77. Closure of S7A energizes the relay 92 which closes a switch 99 in the circuit of the solenoid 76. Energization of the latter shifts the valve 75 to admit fluid to the head end of the cylinder 74 thereby causing both of the bars 32 and 51 to be retracted.

Energization of the relay 92 closes a series of switches 100 respectively interposed in the circuits for the solenoids 28 that start the different tool heads 12, 14, 16, 17 and 19 forwardly provided there are workpieces present in the respective stations as evidenced by closure of switches S10, S11, S12, S13 and S14. In response to energization of any solenoid 28 through a switch 100 and its work detecting switch, its valve 29 is shifted admitting pressure fluid to the head end of the cylinder 26, the direction valve 30a being at this time positioned as shown in Fig. 1. As a result, all of the tool heads advance, the switches S1, S2, S3 and S4 are opened, and the associated switches S1A, S2A, S3A and S4A are closed. These being in parallel with the switches 100 maintain energization of the solenoids 28 after deenergization of the relay 92 which occurs later when the transfer bar 51 becomes fully retracted and opens the switch S6A. Each tool head continues through its cycle automatically, the pilot valve being shifted at the end of the machining cycle to shift the valve 30a and connect the supply line to the rod end of the cylinder 26, thereby initiating rapid return of the associated head. Such return is interrupted automatically by opening of the switches S1A, S2A, S3A and S4A.

The tool heads 12, 14 and 19 which perform the more rapid machining operations execute their cycles in shorter intervals than the slower operating heads 16 and 17, so that the switches S1, S2 and S4 become closed while the switches S3 remain open. Since at this time there will be no workpiece in the idle station 5, the switch S5A will be closed and the switch S5 will be open, thereby disabling the relay 91 so as to prevent energization of the solenoid 45 and raising of the double movement transfer bar 32 in the next cycle. As a result, the solenoid 69 will be energized through switches S5A, S1, S2, S4 and S6, thereby raising the transfer bar 51 into engagement with the workpieces at stations 1, 2, 3, 4, 8 and 9, as shown in Fig. 12. The resulting closure of the switch S7 energizes the solenoid 77 as previously described through the then closed switch S6 so that fluid is admitted to the cylinder 74 to advance both of the transfer bars. The bar 32, being in its lower position, moves idly while the bar 51 transfers work pieces into stations 1 to 5, 9 and 10 as shown in Fig. 13 and in cycle 8 of Fig. 9. Full advance of the transfer bar 51 closes the switch S6A energizing the relay 92 which in turn energizes the solenoid 76 which energizes the solenoids 46 and 69, the latter causing the transfer bar 51 to be lowered out of engagement with the workpieces.

In response to lowering of the bar 51, the relay 92 is energized by closure of the switch S7A. Switch 99 is thus closed to initiate return of the transfer bars and the switches 100 are reclosed thereby again initiating forward advance of the tool heads 12, 14 and 19. Thereafter, the advance and rapid return of all of the heads is completed automatically in the manner previously described. If, because of the relative lengths of the fast and slow machining operations, the fast heads 12, 14 and 19 should complete two of their cycles before the slower heads 16 and 17 are fully returned, it will be impossible to execute another cycle of the transfer bar 51 alone because at this time there will be a workpiece in the idle station 5 so that the switch S5A will be held open and the transfer mechanism thereby disabled. This insures that the double movement bar 32 will be effective in the present instance only in alternate machine cycles.

When all of the heads again reach their fully retracted position, another machine cycle involving movement of all of the workpieces will be initiated automatically and will be executed in the manner previously described.

It will be apparent that in the service use of production line-ups of the character described, varying conditions will be encountered on account of the character of the workpieces being operated upon and the operations to be performed, which conditions will necessitate variations in the timing of the different power actuators or the provision of additional interlocks to insure the intended sequence of operation. Some of these conditions can be satisfied by adjusting the relative speeds of the tool heads. For example, the relation of these speeds should be such that the slow heads do not become fully retracted until full retraction of the transfer bar 51 has occurred following the advance of the workpiece into the idle station 5. Such timing will prevent the restarting of the heads 16 and 17 forwardly while the other heads are executing a cycle.

The progress of workpieces through the machine line-up is illustrated in Fig. 9. The first workpiece W1 is advanced from the loading station 1 to the first operation in the first cycle. In the next three cycles, this piece is moved in successive single lengths through stations 2, 3 and 4 into station 5 by the transfer bar 51, and other workpieces W2, W3 and W4 came into the preceding stations. The double transfer bar 32 becomes active in the fifth cycle during which the pieces W3, W4 and W5 are advanced into stations 2, 3 and 4 by the transfer bar 51 and the pieces W1 and W2 are moved in a double length step from stations 4 and 5 to the slow operation stations 6 and 7 where they remain for two successive cycles. While the slow operations are being performed, the sixth cycle is executed during which the pieces W6, W5, W4 and W3 are moved into stations 2 to 5. When all of the tool heads have completed their cycles, the seventh cycle is initiated during which both transfer bars are raised and impart a double length advance to the pieces W4, W3, W2 and W1, bringing these into stations 6, 7, 8 and 9 respectively. In the same movement, the bar 51 moves the pieces W7, W6, and W5 into stations 2, 3 and 4. In the eighth cycle, the pieces W8, W7, W6, W5, W2 and W1 are advanced one step into stations 2, 3, 4, 5, 9 and 10. The piece W1 has now been operated upon by all of the machines and may be removed from the unloading station. In each succeeding cycle, a finished workpiece will be advanced to the unloading station.

It will be apparent from the foregoing that each of the workpieces is machined in each of the operating stations 2, 4 and 9 in which the fast operations are performed. The slow machining operation is performed on the alternate and odd numbered pieces in the second slow operating station 7 while the remaining or even numbered workpieces are similarly machined in the first slow station 6. By providing more than one operating station for performing the slow machining process, and by advancing the workpieces through the successive stations in the manner described above, the workpieces will progress through the line of machines along a rectilinear path and it is unnecessary to provide for shifting of the pieces laterally out of this path in order to provide for machining of the adjacent workpieces in the different slow machines.

The frequencies with which the active strokes of the different transfer bars occur will of course vary with the number of duplicate stations required in order to avoid slowing up of the line-up by the slowest operation. Thus, the frequency of the fast transfer bar 51 is a multiple, twice in the present instance, of the number of stations provided for performing the slow operation. It will also be apparent that the relative positions of the slow and fast stations in the production line may be varied as desired and that the number of idle stations preceding and following a group of slow operating stations will be determined by the number of such operating stations. Also, where a plurality of slow machining operations are to be performed in combination with one or more fast operations, the duplicate stations for performing the different slow operations may be grouped together along the production line so that one bar may be employed to advance a group of workpieces through all of the slow stations.

I claim as my invention:

1. The method of presenting workpieces to a line of operating stations at least two of which are adapted to perform the same operation and another of which performs a different relatively faster operation, said method comprising imparting to a row of workpieces step-by-step movements equal in length to the spacing of said first mentioned stations whereby to advance the pieces one by one into said faster station, and during part of said movements of such workpieces, imparting to other of the workpieces step-by-step movements to advance workpieces out of said first mentioned stations and present other workpieces to such stations.

2. The method of presenting workpieces to a line of operating stations at least two of which are adapted to perform the same relatively slow operation and others of which perform different relatively faster operations, said method comprising imparting step-by-step movements of equal lengths to a row of workpieces to advance the same into the different ones of fast stations, and during the alternate movements of such workpieces, imparting to other of the workpieces step-by-step movements having lengths which are a multiple of said first mentioned movements to advance workpieces out of said slow stations and present other workpieces to such stations.

3. The method of presenting workpieces to a line of operating stations at least two of which are adapted to perform the same operation and another of which performs a different operation, said method comprising advancing a line of workpieces step-by-step through said last mentioned station in successive operating cycles, and during part of such cycles advancing workpieces out of said first mentioned stations and other workpieces into the latter stations.

4. The method of presenting workpieces to a line of operating stations at least two of which are adapted to perform the same operation and others of which perform different operations, said method comprising advancing a line of workpieces step-by-step through said last mentioned stations in successive operating cycles, and simultaneously with advance of such workpieces during the alternate cycles, advancing workpieces out of said first mentioned stations and other workpieces into the latter stations.

5. The method of presenting workpieces to a line of operating stations at least two of which are adapted to perform the same operation and others of which perform different operations, said method comprising advancing workpieces step-by-step along said line in movements of equal lengths to present the pieces to the different ones of said last mentioned stations, and during the alternate movements of such workpieces, imparting step-by-step movements of greater lengths to other of the workpieces to advance the same out of said first mentioned stations and present other workpieces to such stations.

6. The method of presenting workpieces to a line of operating stations at least two of which are adapted to perform the same relatively slower operation and another of which performs a different operation, said method comprising advancing workpieces step-by-step through said faster station in successive operating cycles, and advancing workpieces out of said slower stations and other workpieces into the latter stations in successive cycles the frequency of which is determined by the number of said slower stations.

7. The method of presenting workpieces to a line of operating stations at least two of which are adapted to perform the same relatively slow operation and another of which performs a different relatively faster operation, said method comprising advancing a line of workpieces step-by-step through said last mentioned stations in successive operating cycles, and advancing workpieces out of said first mentioned stations and other workpieces into the latter stations in successive cycles synchronized with but of lower frequency than said first mentioned cycles.

8. A machine tool organization having, in combination, at least two operating stations having tool heads movable into and out of engagement with workpieces resting in said stations to perform the same operation on such workpieces, an idle station on at least one side of said first stations, an operating station on the side of said idle station opposite said first stations and having a tool head movable into and out of engagement with a workpiece at such station to perform a relatively faster operation thereon, all of said stations being disposed in and spaced along a continuous path in which the workpieces remain while progressing through the successive stations, transfer mechanism operable when effectively coupled to workpieces in said first stations to advance such workpieces to succeeding stations along said path and to move a corresponding number of workpieces into the first stations, other transfer mechanism operable to transfer workpieces successively through said faster station, means controlled by the movements of each of said tool heads for governing the actuation of said mechanisms, and means controlled by the presence or absence of a workpiece in said idle station to render said first mechanism operative and inoperative selectively.

9. A machine tool organization having, in combination, at least two operating stations having tool heads movable into and out of engagement with workpieces resting in said stations to perform the same operation on such workpieces, an idle station on at least one side of said first stations, an operating station on the side of said idle station opposite said first stations and having a tool head movable into and out of engagement with a workpiece at such station to perform a relatively faster operation thereon, all of said stations being disposed in and spaced along a continuous path in which the workpieces remain while progressing through the successive stations, transfer mechanism operable when effectively coupled to workpieces in said first stations to advance such workpieces to succeeding stations along said path and to move a corresponding number of workpieces into the first stations, other transfer mechanism operable to transfer workpieces successively through said faster station, and means controlled by the movements of each of said tool heads for governing the actuation of said mechanisms.

10. A machine organization having, in combination, at least two operating stations disposed side by side and adapted to perform the same operation on workpieces, idle stations on at least one side of said first stations, an operating station on the side of an idle station opposite said first stations and adapted to perform a relatively faster operation than the first stations, all of said stations being disposed in and spaced along a continuous path in which the workpieces remain while progressing through the successive stations, a reciprocable shuttle operable during its active strokes to advance workpieces out of said first stations to succeeding stations along said path and to move a corresponding number of workpieces into the first stations, a second reciprocable shuttle operable to transfer workpieces successively through said faster station, a common actuator for said shuttles, and means for disabling said first mentioned shuttle against effective engagement with the associated workpieces during certain of its active strokes.

11. A machine tool organization having, in combination, a work conveyer defining a rectilinear path of travel for a row of workpieces and providing successive stations spaced apart equal distances, duplicate mechanisms at a plurality of adjacent stations along said path for performing the same operation on workpieces at such stations, there being idle stations on opposite sides of said two stations, mechanism at other of said stations for performing individually different operations, and transfer means operable intermittently in successive cycles to advance workpieces into and out of said last mentioned stations through distances equal to the spacing of the duplicate stations, transfer mechanism operating at a lower frequency than said transfer means and in timed relation thereto to advance workpieces out of said duplicate stations and a corresponding number of the preceding workpieces into such stations.

12. A machine tool organization having, in combination, a work conveyor defining a rectilinear path of travel for a row of workpieces and providing successive stations spaced apart equal distances, duplicate mechanisms at two of the adjacent stations for performing the same operation on two workpieces in said path, there being at least one idle station on opposite sides of said duplicate stations, mechanism at other of said stations for performing individually different operations, transfer means operable intermittently in successive cycles to advance workpieces into and out of said last mentioned stations through distances equal to the spacing of the duplicate stations, and transfer mechanism operating in alternate cycles of said transfer means and in timed relation thereto to advance two workpieces out of said duplicate stations and the two preceding workpieces into such stations.

13. A production line for operating on workpieces having, in combination, at least two operating stations disposed side by side and adapted to perform the same operation on workpieces resting in such stations, idle stations on at least one side of said first stations, an operating station on the side of an idle station opposite said first stations and adapted to perform a relatively faster operation than the first stations, all of said stations being disposed in and spaced along a continuous path in which the workpieces remain while disposed in or progressing through the successive stations, transfer mechanism operable intermittently to advance workpieces out of said first stations to succeeding stations along said path and to move a corresponding number of workpieces into the first stations, and other transfer mechanism operated with greater frequency than said first transfer mechanism to transfer workpieces through said faster station in synchronism with the operation of the first mechanism and in steps each of a length equal to the spacing of said first stations whereby each workpiece is operated upon in said fast station and different workpieces are operated upon in said first stations.

14. A machine organization having, in combination, at least two operating stations disposed side by side and adapted to perform the same operation on workpieces, idle stations on at least one side of said first stations, an operating station on the side of an idle station opposite said first stations and adapted to perform a relatively faster operation than the first stations, all of said stations being disposed in and spaced along a continuous path in which the workpieces remain while progressing through the successive stations, transfer mechanism operable intermittently to advance workpieces out of said first stations to succeeding stations along said path and to move a corresponding number of workpieces into the first stations, and other transfer mechanism operable to transfer workpieces successively through said faster station simultaneously with the operation of said first mechanism and also at one or more times while workpieces are dwelling in said first stations whereby each workpiece is operated upon in said fast station and different workpieces are operated upon in said first stations.

15. A machine tool organization having, in combination, means providing a continuous path for the advance of successive workpieces therealong, a plurality of work stations spaced along said path, mechanism for performing a machining operation on workpieces dwelling at one of said stations, mechanism at a plurality of other stations disposed adjacent each other and operating to perform the same machine operation on workpieces dwelling at such stations, said last mentioned operations being longer than said first operation, and mechanism operated in successive cycles while the workpieces are disengaged from said mechanisms to advance the workpieces step-by-step along said path and present each workpiece to said one station and the odd and even numbered pieces to the respective slow operating stations while maintaining the pieces in said path at all times.

16. A machine organization having, in combination, a plurality of slow operating stations disposed adjacent each other and a relatively faster operating station, said stations being spaced along a production line and separated by an intervening idle station, and power actuated mechanism operated intermittently to advance a row of workpieces along said line to present each workpiece to said fast station and different adjacent workpieces to the respective ones of said slower stations.

17. A machine organization having, in combination, a fast operating station and a plurality of slower operating stations spaced along a production line, and mechanism adapted when operated intermittently to advance a row of workpieces along said line to present each workpiece to said fast station and different workpieces to the respective ones of said slower stations.

18. A machine organization having, in combination, a fast operating station and a plurality of adjacent slower operating stations spaced along a production line and separated by an intervening idle station, power actuated mechanism operated intermittently to advance a row of workpieces along said line to present each workpiece to said fast station and different workpieces to the respective ones of said slower stations, and means controlled automatically by the presence or absence of a workpiece in said idle station to govern the effective engagement between said mechanism and the workpieces in said slow stations.

19. In a multiple station production line, a work transfer mechanism comprising two members engageable with workpieces in different overlapping portions of said line and movable longitudinally of the line to advance workpieces therealong, and power operating mechanisms for effectively actuating said members to advance workpieces at different frequencies and through different distances in said different portions of said line.

20. In a multiple station production line, a work transfer mechanism comprising two members engageable with workpieces in different overlapping portions of said line and movable longitudinally of the line to advance workpieces therealong, and power operating mechanisms for actuating said members simultaneously through different distances which are even multiples of each other.

21. In a multiple station production line, a work transfer mechanism comprising two members engageable with workpieces in different overlapping portions of said line and movable longitudinally of the line to advance workpieces therealong, a common power operator for actuating said members in unison and through different distances, and selectively operable means controlling the engagement between said members and said workpieces whereby to govern the frequency of effective operation of the members.

22. In a multiple station production line, a work transfer mechanism comprising two members engageable with workpieces in different overlapping portions of said line and reciprocable back and forth along the line, at least one of said members being adapted for bodily vertical movement, a common power operator for reciprocating said members in unison and through different distances, and selectively operable means for raising and lowering said one member to control the engagement between the latter and said workpieces.

23. In a multiple station production line, a work transfer mechanism comprising two members engageable with workpieces in different overlapping portions of said line and movable longitudinally of the line to advance workpieces therealong, said members carrying rack teeth, pinions meshing with the teeth on the respective members and proportioned to cause movement of the members through different distances during turning of the pinions through a predetermined distance, and a common power actuator for driving said pinions.

24. In a multiple station production line, the combination of, a work transfer mechanism movable longitudinally of the line and operable when active to advance different groups of workpieces through different distances along the line, a power operator for said mechanism, and selectively operable means controlling the engagement between said mechanism and the different groups of said workpieces.

25. In a multiple station production line, a work transfer mechanism having, in combination, two members overlapping each other at adjacent ends and arranged for endwise reciprocation, mechanism for actuating said members simultaneously at different speeds, and shoulders on said members engageable with workpieces spaced along said line, the shoulders on the overlapping portion of the slower member being yieldable in the direction of the active stroke of the other member whereby to permit a workpiece to be advanced by the latter member ahead of the other member.

26. In multiple station production line, a work transfer mechanism having, in combination, two members overlapping each other at adjacent ends and arranged for endwise reciprocation, mechanism for actuating said members simultaneously at different speeds, means on said members engageable with workpieces spaced along said line to couple the members to the workpieces for movement of the latter with the members, the coupling means on the overlapping portion of one of said members being constructed to permit a workpiece engaged thereby to be advanced to override the latter member during the active stroke of the other member.

27. In a production line having work stations spaced therealong, the combination of mechanisms engageable with workpieces in different portions of said line and operable to advance the engaged workpieces, and means for operating said mechanisms intermittently at different frequencies to advance said workpieces along the different portions of said line and through different distances whereby to present the workpieces for different time intervals to the work stations in said different portions of the line.

CECIL A. WALDSMITH.